United States Patent
Boschis et al.

[11] Patent Number: 5,953,472
[45] Date of Patent: Sep. 14, 1999

[54] METHOD OF AND A DEVICE FOR MAKING BRAGG GRATINGS IN OPTICAL FIBERS OR WAVEGUIDES

[75] Inventors: Laura Boschis; Oriana Rossotto, both of Almese; Luigi Tallone, Paesana, all of Italy

[73] Assignee: CSELT- Centro Studi e Laboratori Telecomunicazioni S.p.A., Turin, Italy

[21] Appl. No.: 09/067,515

[22] Filed: Apr. 27, 1998

[30] Foreign Application Priority Data

May 20, 1997 [IT] Italy .................................. TO97A0424

[51] Int. Cl.⁶ ........................................................ G02B 6/34
[52] U.S. Cl. .............................. 385/37; 385/147; 385/33
[58] Field of Search .................................. 385/37, 14, 45, 385/33, 47, 34, 35, 36, 27, 28, 18, 22, 25, 129, 130, 131, 147

[56] References Cited

U.S. PATENT DOCUMENTS

| 4,725,110 | 2/1988 | Glenn et al. ............................... 385/37 |
| 5,093,876 | 3/1992 | Henry et al. ............................... 385/28 |
| 5,740,290 | 4/1998 | Byron ........................................ 385/27 |
| 5,786,914 | 7/1998 | Fielding ................................. 395/37 X |

FOREIGN PATENT DOCUMENTS

| 0 606 726 | 7/1994 | European Pat. Off. . |
| 0 762 158 | 3/1997 | European Pat. Off. . |
| 2 283 831 | 5/1995 | United Kingdom . |
| WO 95/12136 | 5/1995 | WIPO . |

OTHER PUBLICATIONS

F. Bilodeau et al "High–Return–Loss Narrowband All–FiberBandpass Bragg Transmission Filter", IEEE Photonics Technology Letters, Jan. 1994, vol. 6, No. 1, pp. 80–82.

*Primary Examiner*—Phan T. H. Palmer
*Attorney, Agent, or Firm*—Herbert Dubno

[57] ABSTRACT

A method and a device are described for the simultaneous fabrication of identical Bragg gratings in different optical fibres or optical waveguides. The fibres/waveguides (1) are mounted side-by-side on a common support (2), along with a phase mask (3), which gives the desired intensity distribution to a writing radiation of the grating. Said common support (2) is reciprocated transversally to the longitudinal axis of the fibres or waveguides, at an appropriately low frequency such that each fibre/waveguide is exposed to such a radiation, at each pass under the radiation, for a time sufficient to start a refractive index change.

12 Claims, 1 Drawing Sheet

METHOD OF AND A DEVICE FOR MAKING BRAGG GRATINGS IN OPTICAL FIBERS OR WAVEGUIDES

This invention relates to the fabrication of optical fibre components for optical telecommunications, and more specifically its object is to provide a method of and a device for making identical Bragg gratings in separate photosensitive optical fibres or waveguides.

In optical telecommunication systems use is commonly made of wavelength selective optical components that are based on Bragg gratings made in an optical fibre or planar waveguide and that exploit the fact that a Bragg grating with a given pitch reflects a certain wavelength and transmits the other wavelengths. Said gratings are made of spans of fibre or waveguide that show periodic refractive index changes along their length. A commonly used technique for obtaining these periodic refractive index changes is to illuminate the fibre or the waveguide with an interference fringe pattern obtained through holography or through direct interference between two UV beams or by means of a mask on which a grating has been made which spatially modulates a characteristic of the radiation sent to the fibre or waveguide, e.g. its phase.

In some applications, e.g. for making band pass filters or devices for wavelength insertion-extraction (Add-Drop Multiplexers) it is necessary to make pairs of absolutely identical gratings in both branches of an optical waveguide coupler. In its basic structure, an optical waveguide coupler is formed by two portions of fibre or guide, which are joined in their middle part (coupling region), as depicted in FIG. 1. In order to obtain a grating device of the kind mentioned before, a grating is made in each of the two fibre or waveguide portions (in the region where they are separate), so that the radiation at the wavelength of interest, sent through a coupler branch (for instance, branch 100A), is reflected by both gratings and goes out through one of the other branches, at the same end from which it has been launched (e.g. through branch 101B). If the two gratings are not substantially identical, a non-negligible percentage of such a radiation is reflected towards the input branch, causing disturbances. The term "substantially identical" means here that the spectral response curves must coincide to an extent greater than 90% in the band of interest, in order to keep the unwanted reflection below 10%.

It is extremely difficult to make identical gratings on separate fibres or waveguides by separately writing the gratings on each fibre or guide. As a matter of fact, the characteristics of the sources by which the fibres or guides are illuminated to make such gratings may vary with time and it is therefore difficult to guarantee that all characteristics are still substantially identical at the end of the grating writing into a fibre or guide, when passing to another fibre or guide. On the other hand, the core of a guide (and especially of a fibre) is of particularly small dimensions (a few micron diameter) and it is therefore also difficult to guarantee the same relative position between the different fibres or guides and the optical system focusing the writing radiation.

A different approach is to irradiate the fibres or waveguides by means of a beam that has such a width as to illuminate the cores of all fibres or waveguides. In this case, too, it appears rather difficult to ensure a uniform illumination of all fibres or waveguides by the beam. Besides, the process time becomes longer, and work bench vibrations might occur, which would affect the overall quality.

The present invention aims to provide a method and a device which allow such uniform illumination of all fibres or guides involved in grating writing.

The invention concerns a method wherein the optical fibres or waveguides are exposed, for a portion of their lengths, to a radiation whose intensity distribution is such as to cause periodic refractive index changes in the irradiated fibre or waveguide portion and wherein, for making identical gratings on multiple fibres or waveguides, such fibres or waveguides are located side-by-side and are jointly subjected to a reciprocation transversally to their longitudinal axis, at such a low frequency that, at each pass under the radiation, each fibre or waveguide is exposed to the radiation for a time sufficient to ensure an adequate change in their refractive index.

The present invention also concerns a device for carrying out the process, wherein a source sends towards the fibres or waveguides, through an optical system, a radiation which at its incidence onto the fibres or waveguides shows an intensity distribution such as to originate periodic refractive index changes in the irradiated zone, and wherein, to make identical gratings on multiple fibres or waveguides, these are mounted side-by-side on a common support, associated to means for causing its reciprocation transversally to the longitudinal axis of the waveguides, at such a low frequency that, at each pass under the radiation, each waveguide remains exposed to the radiation for a time sufficient to ensure the refractive index change.

The paper "High-Return Loss Narrowband All-Fibre Bandpass Bragg Transmission Filter, by F. Bilodeau et al., IEEE Photonics Technology Letter, Vol. 6, No 1, January 1994, pages 80–82, discloses a filter based on a coupler like that previously described herein, and states that the filter has a high return loss (30 dB or more) due to the presence of two substantially identical gratings, simultaneously written in both fibres, downstream of the coupling zone with reference to the direction along which the radiation is sent into the filter. No information is given about the approach followed to solve the problem of ensuring uniform irradiation of both fibres during their simultaneous writing.

Also GB-A 2283831 discloses a coupler in which gratings are made in a zone located downstream of the coupling region and states that such gratings are simultaneously written and are substantially identical or form a single grating. Nevertheless, no information is provided about the way such identity is guaranteed.

For the sake of further clarification, reference is made to the accompanying drawings, wherein.

Figure 1:
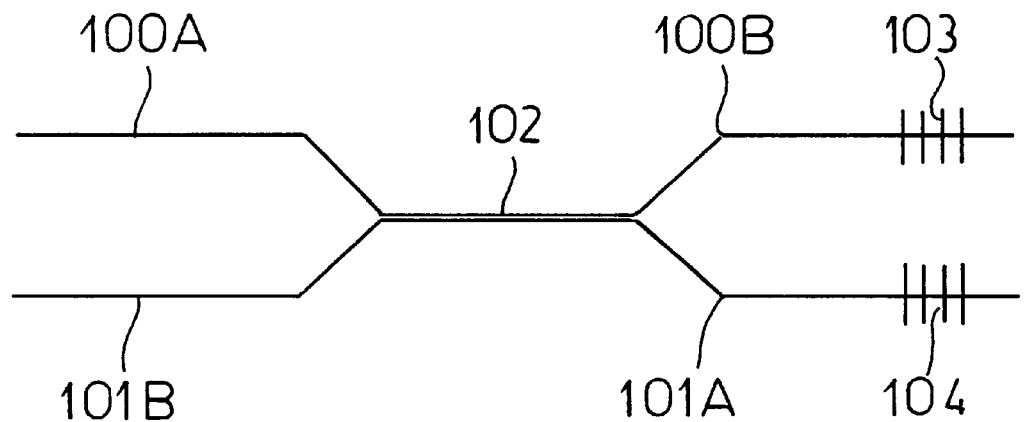
FIG. 1 shows an optical coupler with gratings.

With reference to FIG. 1, a coupler in fibre or waveguide that can be used in grating devices, such as band pass filters or add-drop multiplexers, is formed by two portions of optical fibre or waveguide, which are joined in the central part and form the four branches 100A, 100B, 101A, 101B of the coupler.

The central part 102 forms the coupling region. Both fibres or waveguides have a grating 103, 104, located downstream of coupling region 102, so that the radiation at the wavelength of interest, sent through a coupler branch (e.g. branch 100A), is reflected by both gratings 103,104 and goes out through one of the other branches (in Figure, branch 101B), on the same side where it has been launched. Both gratings must be substantially identical (i.e. must have spectral response curves which, in the band of interest, coincide by more than 90%) in order to minimise the percentage of incident radiation which is reflected towards input branch 100A, causing disturbances.

Figure 2:
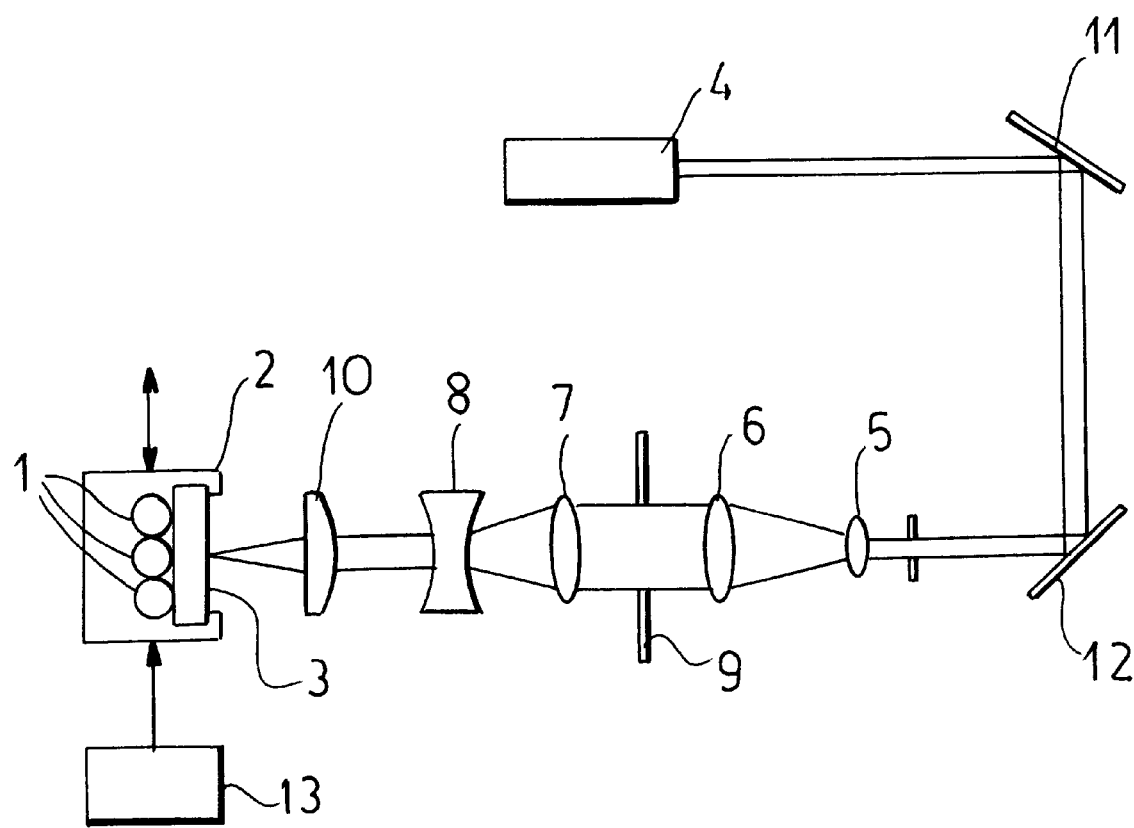
FIG. 2 shows a device for carrying out the method according to this invention.

In FIG. 2 a device suitable for fabricating identical gratings on a group of fibres 1 is depicted. Fibres 1 are mounted in a support 2, which also carries a phase mask 3. This support must guarantee that the position of fibres 1 relative to phase mask 3 remains constant with time. In a conventional way, phase mask 3 is illuminated by the UV radiation emitted by a laser 4, through an optical system capable of creating onto the phase mask an image of the source formed by a thin strip of the same length as the grating to be fabricated.

The optical system includes, in known manner, a first lens 5 to expand the beam emitted by the source; a group of lenses 6,7,8 to generate a collimated beam; a diaphragm 9 between lenses 6,7 to shape the beam, giving it for instance a Gaussian intensity distribution; a cylindrical lens 10 to form the source image on phase mask 3.

Advantageously, the radiation emitted by source 4 is sent towards the optical system through a pair of mirrors 11,12, which allow obtaining, between source 4 and phase mask 3, a sufficiently long path to make the secondary mode effect negligible and at the same time allow keeping the device to a small size.

For the fabrication of identical gratings on the different fibres 1, support 2 is mounted on a guide (not depicted), perpendicular to the longitudinal axis of the fibres, along which guide said support can be reciprocated, for instance under the control of a motor 13, so as to cause the UV radiation to scan the fibres. Scanning of the fibres determines that at each pass under the radiation said fibres substantially receive the same beam, thus obtaining the actual identity of the gratings being fabricated and avoiding problems due for instance to an alignment between fibres 1 and optical system 5–10 which might be not completely accurate. To guarantee this, it is advantageous that laser 4 be a continuous wave laser; also a pulsed laser can be used, such an excimer laser, but it must show a high pulse repetition rate, e.g. a rate higher than one hundred Hz (e.g. 100–150 Hz).

The frequency of the reciprocation and the overall duration of irradiation are dependent on the source power, on the photosensitivy characteristics of the fibres as well as on the number of fibres into which the gratings are to be written. In any case such frequency shall have to be sufficiently low as to guarantee that each fibre, at each step, remains exposed for a sufficient time such as to ensure the start of the refractive index variation: thanks to the repeated passages of each fibre before the irradiating beam, an integration in time is then obtained of the irradiated power so that at the process end the refractive index differences actually needed for a grating are obtained.

In an exemplary embodiment of this invention, in which the gratings have been written on conventional hydrogenated silica fibres, reciprocation frequencies of 1 Hz or less have proven as adequate; values lower than 1 Hz are required in particular if a pulsed laser is used. By using a continuous wave laser with a power of the order of a few hundred mW (e.g. 500 mW), the fabrication of the gratings on a pair of fibres has required a few minutes, which time is quite compatible with industrial production requirements. Said time can be cut down if use is made of laser of higher power (1–2 W) or of fibres having a higher photosensitivity with respect to conventional fibres (e.g. fibres doped with Germanium in high concentrations and/or having particular refractive index distributions).

It is evident that the description above is provided purely by way of a non limiting example and that variations and/or modifications are possible without thereby departing from the scope of the invention itself. For instance, even if FIG. 2 shows a group of fibres, the description applies also to the case of planar waveguides: in particular, in the case of a waveguide coupler in which the two waveguides are fabricated on a some wafer, the wafer will be mounted on support 2.

We claim:

1. Device for making Bragg gratings in optical waveguides, in which a source (4) sends towards the waveguides (1) through an optical system (5–10) a radiation which at its incidence on the waveguides (1) has an intensity distribution such as to cause periodic refractive index changes in the irradiated zone, characterised in that, to make identical gratings on multiple waveguides (1), said waveguides are mounted side-by-side on a common support (2) associated with means (13) to import it a reciprocation transversal to the longitudinal axis of the waveguides (1), at such a low frequency that, at each pass under the radiation, each waveguide remains exposed to the radiation for a sufficient time so as to start the refractive index change.

2. Device as claimed in claim 1, characterised in that source (4) is a pulsed source, with a pulse repetition rate much higher than the frequency of the reciprocation.

3. Device as claimed in claim 2, characterised in that the pulse repetition rate is at least 100 Hz.

4. Device as claimed in claim 1, characterised in that said support (2) also carries a phase mask (3), solid with the waveguides (1).

5. Device as claimed in claim 1, characterised in that the means (13) for causing a reciprocation of said support (2) are arranged to induce a motion at a frequency of the order of 1 Hz or less.

6. Device as claimed in claim 1, characterised in that the source (4) is a continuous wave source.

7. Method of making Bragg gratings in single mode optical waveguides (1), in which the waveguides (1) are exposed for a portion of their length to the action of a radiation with an intensity distribution such as to cause periodic refractive index changes along the irradiated zone, characterised in that, for making identical gratings on multiple waveguides (1), said waveguides (1) are located side-by-side and are jointly subjected to a reciprocation transversal to their longitudinal axis, at such a low frequency that, at each pass under the radiation, each waveguide remains exposed to the radiation for a time sufficient to start the refractive index variation.

8. Method as claimed in claim 7, characterised in that such a radiation is a pulsed radiation with a pulse repetition rate much higher than the frequency of the reciprocation.

9. Method as claimed in claim 8, characterised in that the pulse repetition rate is at least 100 Hz.

10. Method as claimed in claim 7, in which said radiation is sent onto the waveguides (1) by means of a phase mask (3), characterised in that said mask (3) is subjected to the reciprocation jointly with the waveguides (1).

11. Method as claimed in claim 7, characterised in that such reciprocation has a frequency of the order of 1 Hz or less.

12. Method as claimed in claim 7, characterised in that said radiation is a continuous radiation.

* * * * *